United States Patent
Leighton (10) Patent No.: US 9,427,854 B2
(45) Date of Patent: Aug. 30, 2016

(54) TELESCOPING UNIVERSAL GAS VALVE KEY

(71) Applicant: JOE LEIGHTON & ASSOCIATES, INC., Corona, CA (US)

(72) Inventor: Lisa Leighton, Dana Point, CA (US)

(73) Assignee: JOE LEIGHTON & ASSOCIATES, INC., Corona, CA (US)

( * ) Notice: Subject to any disclaimer, the term of this patent is extended or adjusted under 35 U.S.C. 154(b) by 207 days.

(21) Appl. No.: 14/134,003

(22) Filed: Dec. 19, 2013

(65) Prior Publication Data

US 2014/0103242 A1  Apr. 17, 2014

Related U.S. Application Data

(63) Continuation of application No. 13/072,477, filed on Mar. 25, 2011, now abandoned, which is a continuation-in-part of application No. 12/793,893, filed on Jun. 4, 2010, now abandoned, which is a continuation of application No. 12/267,988, filed on Nov. 10, 2008, now abandoned.

(51) Int. Cl.
| | |
|---|---|
| *B25B 23/16* | (2006.01) |
| *F16K 31/60* | (2006.01) |
| *B25B 13/06* | (2006.01) |
| *B25B 13/48* | (2006.01) |

(Continued)

(52) U.S. Cl.
CPC .............. *B25B 23/16* (2013.01); *B25B 13/06* (2013.01); *B25B 13/481* (2013.01); *B25B 23/0021* (2013.01); *B25G 1/04* (2013.01); *F16K 31/60* (2013.01)

(58) Field of Classification Search
CPC ... B25B 23/16; B25B 23/0021; B25B 13/06; B25B 13/481; B25G 1/04; F16K 31/60
USPC ............................................. 81/177.2, 124.4
See application file for complete search history.

(56) References Cited

U.S. PATENT DOCUMENTS

| | | | | |
|---|---|---|---|---|
| 1,202,601 | A | * | 10/1916 | Snyder ................. F16L 37/144 16/429 |
| 2,051,953 | A | | 8/1936 | Leathers |
| 2,054,978 | A | | 9/1936 | Hoelscher |
| 2,156,984 | A | | 10/1937 | Haupt |

(Continued)

OTHER PUBLICATIONS

Complaint for Patent Infringement and Exhibits 1-5; *Joe Leighton & Associates, Inc.* dba *Canterbury Enterprises v. Imperial Sheet Metal Ltd.*; Case CV07-04257; 22 pages.

(Continued)

*Primary Examiner* — Hadi Shakeri
(74) *Attorney, Agent, or Firm* — Stetina Brunda Garred and Brucker (57) ABSTRACT

Provided is a gas valve key having a valve engagement body including a stem receiving cavity sized and configured to receive a gas valve stem. The key includes a first elongate member including a first body having first proximal and distal end portions. The first distal end portion defines a first end face. A second elongate member is connected to the valve engagement body and includes a second body having second proximal and distal end portions. The second elongate member is slidably connected to the first elongate member. The gas valve key further includes a locking element having a hook portion being disposable within an aperture formed within the first body to mitigate movement of the second elongate member relative to the first elongate member when the second elongate member is in an extended position.

18 Claims, 5 Drawing Sheets

(51) Int. Cl.
    *B25B 23/00*    (2006.01)
    *B25G 1/04*    (2006.01)

(56) References Cited

U.S. PATENT DOCUMENTS

| | | | |
|---|---|---|---|
| 3,877,327 A | | 4/1975 | Erm |
| 4,376,397 A | | 3/1983 | Newby et al. |
| 4,542,666 A | | 9/1985 | White |
| 4,905,548 A | | 3/1990 | Colace et al. |
| 5,138,911 A | | 8/1992 | Lan |
| 5,269,589 A | | 12/1993 | Brothers et al. |
| 5,462,380 A | * | 10/1995 | Peek .................. A61G 5/12 285/308 |
| 5,778,914 A | * | 7/1998 | Trani .................. A45B 3/00 135/66 |
| 5,813,296 A | | 9/1998 | Hoff et al. |
| 5,911,523 A | | 6/1999 | Burchart |
| 6,131,604 A | | 10/2000 | Harriss |
| 6,176,160 B1 | | 1/2001 | Ruhlander et al. |
| 6,269,717 B1 | | 8/2001 | Bollinger |
| 7,055,412 B2 | | 6/2006 | Leighton |

OTHER PUBLICATIONS

Complaint for Patent Infringement and Exhibits 1-3; *Joe Leighton & Associates, Inc.* dba *Canterbury Enterprises* v. *Log Lighter Sales, Inc.*; CaseCV07-04254; 20 pages.

* cited by examiner

TELESCOPING UNIVERSAL GAS VALVE KEY

CROSS-REFERENCE TO RELATED APPLICATIONS

This is a continuation application of application Ser. No. 13/072,477 flied on Mar. 25, 2011, which is a continuation-in-part application of application Ser. No. 12/793,893 filed on Jun. 4, 2010, which is a continuation application of application Ser. No. 12/267,988, filed on Nov. 10, 2008, the entire contents of which are expressly incorporated herein by reference.

STATEMENT RE: FEDERALLY SPONSORED RESEARCH/DEVELOPMENT

Not Applicable

BACKGROUND

1. Field of the Invention

The present invention relates generally to a key for turning a gas valve, and more specifically to a gas valve key configured to extend between a retracted position and an extended position to vary the length thereof.

2. Description of the Related Art

Many modern fireplaces now utilize gas to provide a flame for fake firewood or to assist in lighting real firewood. Common to both is a source of natural gas which may be piped within proximity of the hearth of the fireplace. Typically, the gas source is controlled by a shut-off valve near the fireplace. Downstream of the shut-off valve, accessories such as log lighter burner pipes or air-gas mixing chambers may be installed to condition the flow of gas out into the fireplace and to distribute the gas such that an optimal flame may be burned.

Most gas shut-off valves provide a stem to either open or close the gas shut-off valve. The stem most commonly has a square cross section. A gas valve key normally has a receiving socket which is adapted to receive the stem. The gas valve key typically further includes a shaft attached to one end of the socket. On the other end of the shaft, a handle is formed or attached so that the operator can easily provide the leverage to rotate the key either clockwise or counter-clockwise for opening or closing the valve.

Due to the nature of the key being separately detached from the gas shut-off valve, the gas valve key can be misplaced, similar to that of any other key. When the key is lost, the owner of the gas fueled system must then obtain a new gas valve key. Such gas valve keys are typically stocked at fireplace accessory stores and/or in some circumstances hardware stores.

A common problem occurs when the person who needs a key finally locates a store which supplies gas keys, realizes after the purchase of a new key or is apprised by an informed fireplace supplies store employee, that there are different sizes of valve stems. Many times the purchaser brings the gas key home and then only when the key is installed onto the stem of the gas shut-off valve, is made aware that they bought the wrong key. Other times, the purchaser is made aware of the dilemma at the store, and has to make a guess as to which size gas valve their system may utilize.

Another varying characteristic among gas valve keys is the length of the shaft. More specifically, the length of the shaft may vary depending on the placement of the gas valve. For instance, sometimes the gas valve may be very close to the front wall adjacent the fireplace, and therefore, a gas valve key with a short shaft may be utilized. Other times, the gas valve is recessed a substantial distance within the front wall of the fireplace, and therefore, a longer shaft is utilized on the gas valve key. As such, the person must purchase the longest valve key available to ensure that the gas valve key can reach the stem of the gas shutoff valve even if the longest gas valve key is too long and a shorter gas valve key would be more appropriate.

It would be beneficial to provide a gas valve key which is capable of reaching and engaging with most valve stems. If such device could be devised, the purchaser would be relieved of the headaches of inadvertently purchasing the wrong sized key and/or wrong length key. Moreover, the supplier can save shelf space and simplify inventory by using a universal gas valve key, instead of having to stock multiple sizes and/or lengths of gas valve keys which are only capable of being used in certain circumstances.

BRIEF SUMMARY

A gas valve key which is extendable between an extended position and a retracted position is disclosed herein. The extendable nature of the gas valve key may enable interaction with a gas valve stem which protrudes from the outer surface of a wall, as well as a gas valve stem which is recessed a shallow or substantial distance from the outer surface of the wall.

One embodiment of the gas valve key includes a first elongate member defined by a first body having a proximal end portion and a first distal end portion defining a first end face. The first body includes a first outer surface and a first inner surface extending into the first body from the first end face to define a body cavity. A first body aperture extends from the first inner surface toward the first outer surface.

The gas valve key additionally includes a second elongate member defined by a second body having a second proximal end portion and a second distal end, the second elongate member is slidably connected to the first elongate member and is slidable between an extended position and a retracted position. An extended portion of the second elongate member extends between the first end face and the second distal end, with the extended portion being extendable upon movement of the second elongate member from the retracted position towards the extended position.

The gas valve key includes a locking element to mitigate movement of the second elongate member relative to the first elongate member. The locking element is rotatable relative to the second elongate member between a locked configuration and an unlocked configuration. The locking element defines a hook portion which is disposed within the first body aperture when the locking element is in the locked configuration to mitigate movement of the second elongate member relative to the first elongate member when the second elongate member is in the extended position.

The gas valve key further includes a valve engagement body connected to one of the first elongate member and the second elongate member. The valve engagement body is sized and configured to be engageable with the gas valve stem.

BRIEF DESCRIPTION OF THE DRAWINGS

These and other features and advantages of the various embodiments disclosed herein will be better understood with respect to the following description and drawings in which like numbers refer to like parts throughout and in which.

DETAILED DESCRIPTION

Referring now to the drawings wherein the showings are for purposes of illustrating a preferred embodiment, and not for purposes of limiting the same, FIGS. 1-7 illustrate an embodiment of an extendable gas valve key 10. The gas valve key 10 may be used to turn a gas valve stem to open or close a gas valve (not shown). The length of the extendable/telescoping gas valve key 10 may be varied depending on the placement of the gas valve stem. More specifically, the length of the extendable gas valve key 10 may be increased to reach a gas valve stem positioned deep within the hearth of a fireplace. Conversely, the length of the extendable gas valve key 10 may be shortened to reach a gas valve stem disposed in a shallow position within the hearth of the fireplace.

Figures 1, 2:
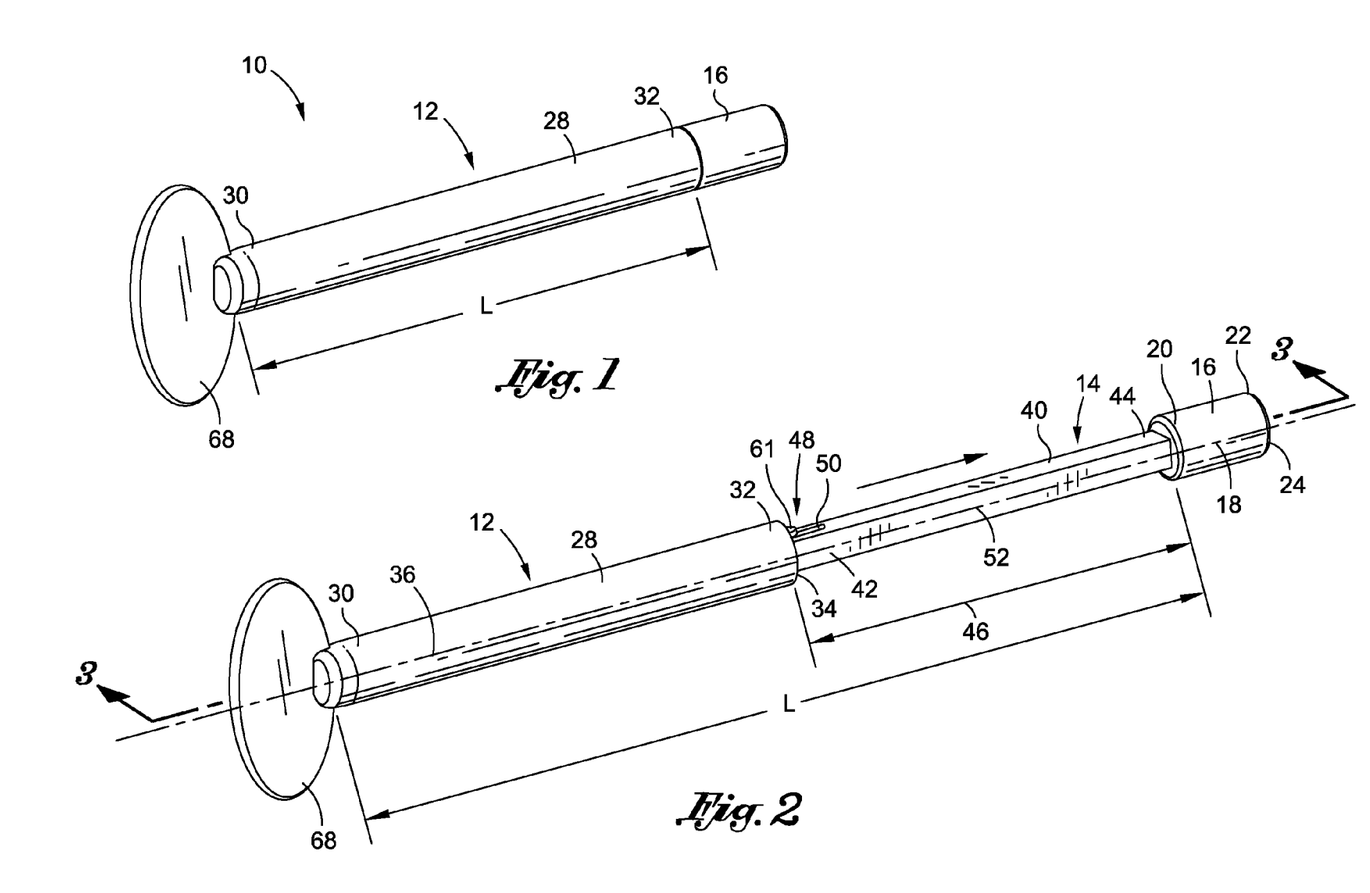
FIG. 1 is an upper perspective view of an embodiment a gas valve key constructed in accordance with an embodiment of the present invention, the gas valve key being disposed in a retracted position.
FIG. 2 is an upper perspective view of the gas valve key illustrated in FIG. 1, the gas valve key being disposed in an extended position.

One embodiment of the extendable/telescoping gas valve key 10 includes a valve engagement body 16 configured to engage with the gas valve stem. The valve engagement body 16 includes an engagement proximal end portion 20 and an opposing engagement distal end portion 22 defining an engagement end face 24. The valve engagement body 16 defines an engagement axis 18 extending between the engagement proximal end portion 20 and the engagement distal end portion 22. As shown in FIGS. 1 and 2, the valve engagement body 16 defines a substantially cylindrical shape; however, it is understood that the valve engagement body 16 may define other shapes.

The valve engagement body 16 includes a stem receiving cavity 26 (see FIG. 3) extending inwardly from the engagement end face 24. The stem receiving cavity 26 is sized and configured to receive the gas valve stem. In one embodiment, the stem receiving cavity 26 defines a shape that is substantially complimentary to the gas valve stem to facilitate mating engagement between the gas valve stem and the valve engagement body 16 upon receipt of the gas valve stem into the stem receiving cavity 26. In this manner, the stem receiving cavity 26 is configured to tightly engage with the gas valve stem to enable rotation of the gas valve stem upon rotation of the valve engagement body 16.

It is understood that gas valve stems may be formed in a wide range of shapes and sizes. Therefore, the stem receiving cavity 26 may similarly be formed in a wide range of shapes and sizes. For instance, the stem receiving cavity 26 illustrated in FIG. 3 defines a substantially quadrangular cross section. As used herein, quadrangular may refer to a four-sided structure, including, but not limited to, a square or rectangle. The quadrangularly shaped stem receiving cavity 26 illustrated in FIG. 3 is configured to receive a quadrangularly shaped gas valve stem (not shown).

The engagement between the valve engagement body 16 and the gas valve stem causes the gas valve stem to rotate in response to rotation of the valve engagement body 16 about the engagement axis 18. For instance, the gas valve may be opened by rotation of the gas valve stem in a first direction and closed by rotation of the gas valve stem in a second direction. Therefore, rotation of the valve engagement body 16 may enable control of the gas valve when the gas valve stem is received within the valve engagement body 16.

Figures 3, 4:
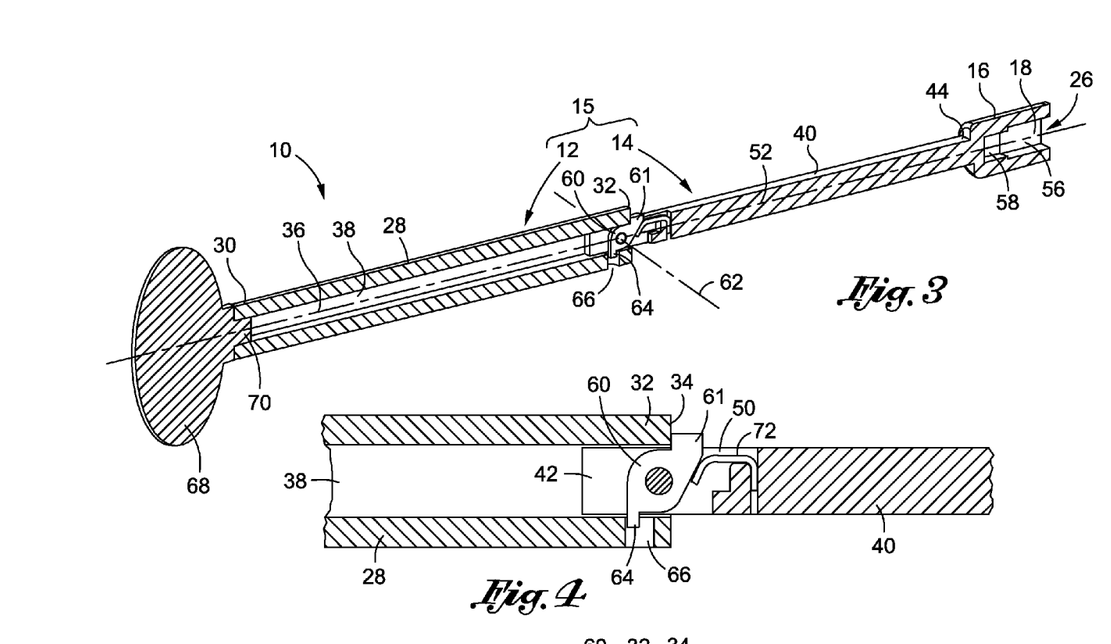
FIG. 3 is a sectional upper perspective view of the gas valve key illustrated in FIG. 2, the gas valve key having a first elongate body and a second elongate body slidably attached thereto.
FIG. 4 is an enlarged elevation view of a locking element disposed in a locked configuration when the gas valve key is in the extended position.
Figure 5:
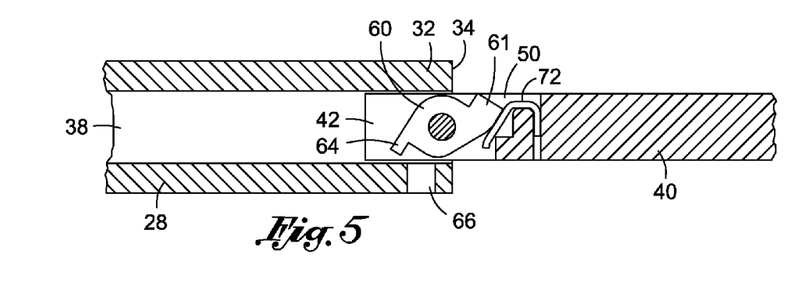
FIG. 5 is an enlarged elevation view of the locking element disposed in an unlocked configuration to enable slidable movement of the second elongate body relative to the first elongate body.

Referring now to the embodiment depicted in FIG. 3, the valve engagement body 16 may be configured to engage with valve stems that vary in size and/or shape. To this end, one aspect of the present invention includes a valve engagement body 16 having a nested or cascaded arrangement of a plurality of stem receiving cavities. In particular, a first stem receiving cavity 56 is shown in a most outward portion of the valve engagement body 16 and is centered about the engagement axis 18. Further recessed within the valve engagement body 16 is a second stem receiving cavity 58, having a square-cross section that is smaller than the cross-section of the first stem receiving cavity 56. Thus, the contiguous positioning of the first stem receiving cavity 56 and the second stem receiving cavity 58 forms one continuous cavity 26 having stepped sides. In particular, a first set of sides are internally formed in the valve engagement body 16 in a substantially parallel relationship to the engagement axis 18. At the position where the first set of stepped sides terminates, a set of stepped shoulder sides are provided in normal or perpendicular orientation to the first set of stepped sides and to the engagement axis. The second set of stepped sides are formed which are also in a substantially parallel relationship to the engagement axis 18. The second stem receiving cavity 58 is further defined by an inner side which intersects the most inward ends of the second set of stepped sides and the engagement axis 18 in a substantially normal or perpendicular orientation.

In one embodiment, the first stem receiving cavity 56 is adapted to receive and engage with a 5/16 inch valve stem and the second stem receiving cavity 58 is adapted to receive and engage with a 1/4 inch valve stem. Thus, the dimensions of cross-section of the first stem receiving cavity 56 should slightly exceed 5/16 inch and the dimension of the cross-section of the second stem receiving cavity 58 should slightly exceed 1/4 inch. It is further appreciated that the valve engagement body 16 may be designed to fit other sizes of valve stems. Furthermore, it is understood that the cross-sectional shape of the stem-receiving cavities 56, 58 may have a shape other than a square. Therefore, other valve engagement bodies 16 may be provided which include numerous permutations and/or combinations of a number of nested cavities which are adapted to fit various shapes of valve stems, if so required.

The gas valve key 10 further includes an extendable arm 15 connected to the valve engagement body 16 to allow a user to engage the gas valve stem with the valve engagement body 16, regardless of whether the gas valve stem is deeply recessed within a wall or mantle, or slightly recessed therein. The extendable arm 15 includes a first elongate member 12 connected to a second elongate member 14. The second elongate member 14 is slidably connected to the first elongate member 12 to allow for extension of the gas valve key 10. The Figures show the second elongate member 14 slidable within the first elongate member 12. However, it is also contemplated that the various aspects disclosed herein may be employed in reverse orientation where the first elongate member 12 is slidable within the second elongate member 14.

The first elongate member 12 includes a first body 28 extending along a first axis 36 between a first proximal end portion 30 and a first distal end portion 32. The first distal end portion 32 defines a first end face 34. Similarly, the second elongate member 14 includes a second body 40 extending along a second axis 52 between a second proximal end portion 42 and a second distal end portion 44. The valve engagement body 16 is connected to the second distal end portion 44 of the second body 40. In one embodiment, the valve engagement body 16 is integrally formed with the second distal end portion 44. In another embodiment, the valve engagement body 16 is detachably coupled to the second distal end portion 44.

As depicted in the Figures, the first body 28 may have a circular cross-section in a plane substantially perpendicular to the first axis 36. The second body 40 may have a quadrangular cross-section in a plane substantially perpendicular to the second axis 52. However, it is understood that other embodiments may include first and second bodies 28, 40 that define other cross-sectional shapes.

The first body 28 includes a body cavity 38 extending inwardly from the first end face 34. The second body 40 is slidable within the body cavity 28 to achieve slidable movement of the second body 40 relative to the first body 28. In this manner, the body cavity 28 may be sized and configured to be complimentary in shape (e.g., quadrangular as shown, or circular, triangular, etc.) to the second body 40.

The second body 40 is slidable between an extended position and a retracted position relative to the first body 28. An extended portion 46 (see FIG. 2) of the second elongate member 14 extends between the first end face 34 and the valve engagement body 16. The extended portion 46 is extendable upon movement of the second elongate member 14 from the retracted position towards the extended position. Therefore, as the second elongate member 14 moves from the retracted position towards the extended position, the extended portion 46 increases. Conversely, as the second elongate member 14 moves from the extended position towards the retracted position, the extended portion 46 decreases.

The extendable arm 15 defines an operative length "L" as the distance between the first proximal end portion 30 of the first body 28 and the second distal end portion 44 of the second body 40. As the second elongate member 14 moves relative to the first elongate member 12, the operative length L changes. In the embodiment shown in the Figures, the operative length L may be shortened to be substantially equal to the first elongate member 12 when in the retracted position (shown in FIG. 1). In other words, the second elongate member 14 is substantially received within the body cavity 38 when in the retracted position. Therefore, the length of the body cavity 38 is substantially equal to or greater than the length of the second elongate member 14 in order to substantially receive the second elongate member 14 therein. It is also contemplated that the body cavity 38 may have a length that is less than the length of the second elongate member 14.

In the extended position, the operative length L may be substantially equal to the length of the first elongate member 12 plus the length of the second elongate member 14. It is understood that some overlap may be necessary to maintain the connection between the first and second elongate members 12, 14. However, the lengths of both the first and second elongate members 12, 14 may substantially contribute to the operative length L when the valve key 10 is in the extended position.

The extendable arm 15 may have an operative length L approximately equal to four inches in the retracted position, and eight inches in the extended position. As such, purchasers of gas valve keys do not need to guess whether the length of the gas valve key is appropriate for their present situation. The extendable/telescoping gas valve key 10 will reach the gas valve stem regardless of the depth position of the gas valve stem. It is understood that other embodiments of the extendable gas valve key 10 may define operative lengths L that are shorter than four inches in the retracted position or longer than eight inches in the extended position, and that specific embodiment discussed above is exemplary in nature only and is not intended to limit the scope of the present invention.

Although the specific embodiment of the gas valve key 10 illustrated in the figures includes a body cavity 38 formed within the first elongate member 12, wherein the body cavity 38 is configured to receive the second elongate member 14, it is understood that in other embodiments, the body cavity 38 is formed in the second elongate member 14. In this manner, the first elongate member 12 may be received within the second elongate member 14. Furthermore, although the embodiment shown in the Figure includes a first elongate member 12 and a second elongate member 14, it is contemplated that additional elongate members may be incorporated to allow for further extension of the gas valve key 10. For instance, one embodiment of the gas valve key 10 may include three or more elongate members which collectively define the extendable arm 15.

It is also contemplated that slidable movement between the first and second elongate members 12, 14 may be achieved without having one elongate member being slidably received within the other elongate member. For instance, the elongate members 12, 14 may slide adjacent one another. In this regard, a bracket may connect the elongate members 12, 14 and allow for slidable movement therebetween. The bracket may be connected to slots formed within the respective elongate members 12, 14. In another embodiment, one elongate member may include a groove formed on an exterior surface thereof. The other elongate member may be slidably received within the groove to facilitate slidable movement of one elongate member relative to the other.

According to another embodiment, the first elongate member 12 and the second elongate member 14 are detachably connected to each other. More specifically, the first distal end portion 32 of the first body 28 includes a first coupling mechanism that is mechanically connectable to a second connecting mechanism formed on the second proximal end portion 42 of the second body 40. The first and second connection members may be detachably connected thereto to achieve extension of the gas valve key 10. The valve engagement body 16 may also be configured to be detachably connected to the first distal end portion 32 and the second distal end portion 44. When a shorter gas valve key 10 is desired, the valve engagement body 16 may be directly connected to the first distal end portion 32 of the first body 28. Conversely, when a longer gas valve key 10 is desired, the second elongate member 14 may be connected to the first elongate member 12. In this case, the valve engagement body 16 may be connected to the second distal end portion 44 of the second elongate member 14. In this manner, the second elongate member 14 acts as an extension piece between the first elongate member 12 and the valve engagement body 16. Further extension of the gas valve key 10 may be achieved by adding one or more elongate members between the first elongate member 12 and the valve engagement body 16.

It is contemplated that the first and second elongate members 12, 14, as well as the valve engagement body 16 may be formed of a strong durable material capable of withstanding repeated usage thereof. For instance, the aforementioned components may be formed of a metallic material, a polymeric material, or other durable materials known by those skilled in the art.

Referring back to the embodiment illustrated in the FIGS. 1-5, wherein the second elongate member 14 is slidably received within the first elongate member 12, one embodiment of the gas valve key 10 includes a locking element 48 that is engageable with the first elongate member 12 and the second elongate member 14 when the second elongate member 14 is in the extended position to prevent push in of the second elongate member 14 into the first elongate member 12 after the second elongate member 14 is traversed to the extended position. Also, the locking element 48 mitigates pullout of the second elongate member 14 from the first elongate member 12. As depicted, the locking element 48 includes a locking cam 60 having a cam arm 64. The locking cam 60 is rotatably connected to the second elongate member 14 and is rotatable about a locking element rotation axis 62. The first elongate member 12 includes one or more cam engagement apertures 66 formed therein for engagement with the cam arm 64. In other words, the locking cam 60 rotates to bring the cam arm 64 into engagement with the cam engagement aperture 66. When the cam arm 64 is disposed within the cam engagement aperture 66, the second elongate member 14 cannot be pushed into the first elongate member 12. The cam arm 64 engages the cam engagement aperture 66 and a second cam arm 61 engages the first end face 34. An exposed portion or second cam arm 61 of the cam 60 may extend out of a cam slot 50 (see FIG. 2) formed within the second elongate member 14. When a user desires to disengage the locking cam 60 from the first elongate member 12, the exposed portion 61 may be pressed into the cam slot 50, thereby causing the cam arm 64 to rotate out of engagement with the cam engagement aperture 66.

In one embodiment, a cam spring 72 biases the cam arm 64 into engagement with the cam engagement surface 66 and the second cam arm or exposed portion 61 into engagement with the first end face 34. As illustrated in the Figures, the cam spring 72 biases the locking cam 60 in a counter-clockwise direction. Therefore, the biasing force of the cam spring 72 must be overcome to rotate the cam arm 64 out of engagement with the cam engagement aperture 66 and the exposed portion or second cam arm 61 out of engagement with the first end surface 34.

Although the embodiment illustrated in the Figures includes a locking cam 60 coupled to the second elongate member 14, with the corresponding cam engagement aperture 66 formed in the first elongate member 12, it is understood that other embodiments may include a locking cam 60 coupled to the first elongate member 12 with the corresponding cam engagement aperture 66 formed on the second elongate member 14. Furthermore, it is contemplated that more than one cam engagement aperture 66 may be formed within the extendable arm 15. In this manner, the first and second elongate members 12, 14 may be locked in more than one position.

Figure 6:
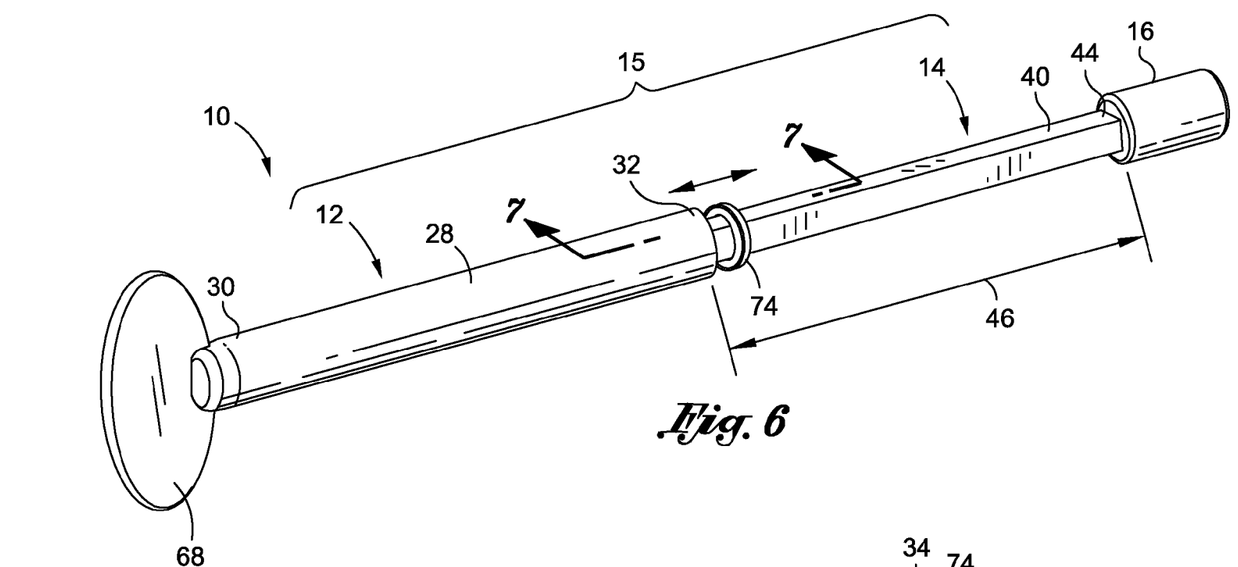
FIG. 6 is an upper perspective view of a second embodiment of the gas valve key having a first elongate member, a second elongate member, and an o-ring locking member disposed about the second elongate member.
Figure 7:
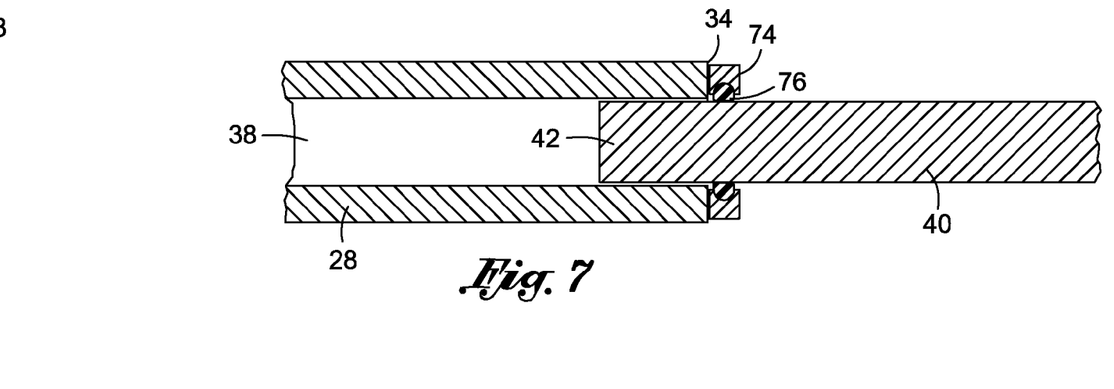
FIG. 7 is an enlarged elevation view of the interconnection of the first and second elongate members, wherein the o-ring locking member mitigates further insertion of the second elongate member within the first elongate member.
Figure 8:
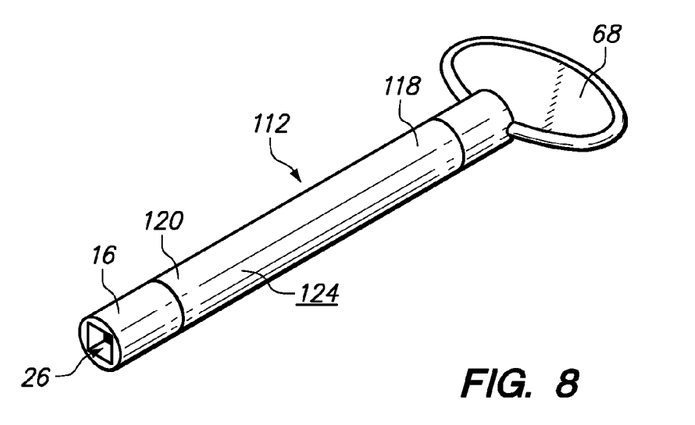
FIG. 8 is an upper perspective view of a third embodiment of the gas valve key depicted in a retracted position.
Figure 9:
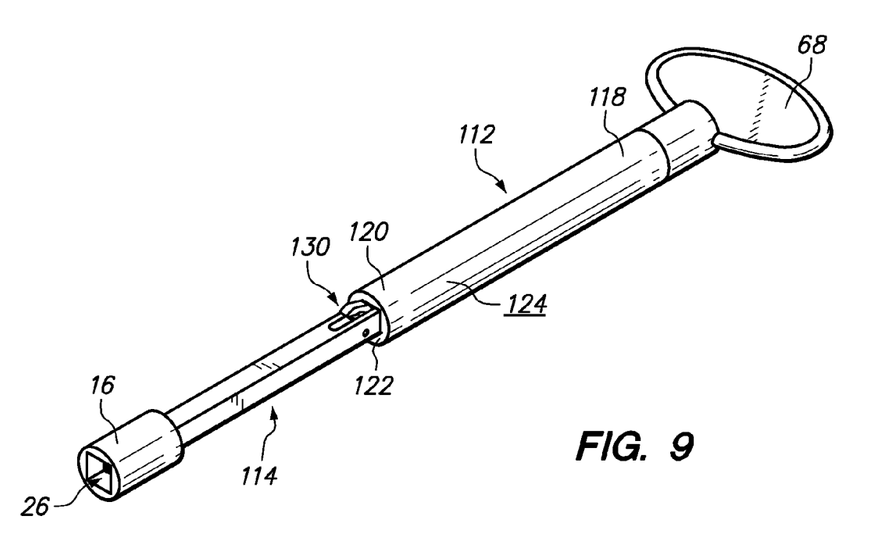
FIG. 9 is an upper perspective view of the gas valve key depicted in FIG. 8, with the gas valve key being in an extended position.

Referring now to the embodiment illustrated in FIGS. 6-7, there is shown a gas valve key 10 having an o-ring locking member 74 for mitigating movement of the second elongate member 14 toward the retracted position. The o-ring locking member 74 is circumferentially disposed about the second body 40, and may be moved along the length thereof. More specifically, the o-ring locking member 74 may be moved along the length of the second body 40 between the second proximal and distal end portions 42, 44 as desired by a user. As the second elongate member 14 is moved toward the recessed position, the o-ring locking member 74 comes into contact with the first elongate member 12 to mitigate further movement of the second elongate member 14 towards the recessed position. The o-ring locking member 74 includes an o-ring 76 that frictionally engages with the second elongate member 14 to restrict such movement. In other words, when the o-ring locking member 74 comes into contact with the first elongate member 12, frictional forces between the o-ring 76 and the outer surface of the second body 40 of the second elongate member 14 mitigate further movement of the second elongate member 14 towards the recessed position. O-ring 76 may match the cross sectional configuration of the second body 40. As such, the o-ring 76 does not necessarily have a circular configuration.

The gas valve key 10 includes a handle 68 connected to the extendable arm 15. The handle 68 may facilitate rotation of the gas valve key 10 when the valve engagement body 16 is engaged with the valve stem. The handle 68 may be integrally formed with the extendable arm 15, or detachable connected thereto. In the embodiment illustrated in the Figures, the handle 68 includes a handle engagement element 70 (see FIG. 3) that is received within the first elongate member 12. The handle 68 attached to the first elongate member 12 by way of a press fit engagement between the first elongate member and the handle 68, or a mechanical fastener such as adhesive or rivet, or other mechanical fasteners known in the art may also be used.

Referring now to FIGS. 8-12, there is shown an additional embodiment of a gas valve key 110 having a locking mechanism 130.

Figures 10, 11, 12:
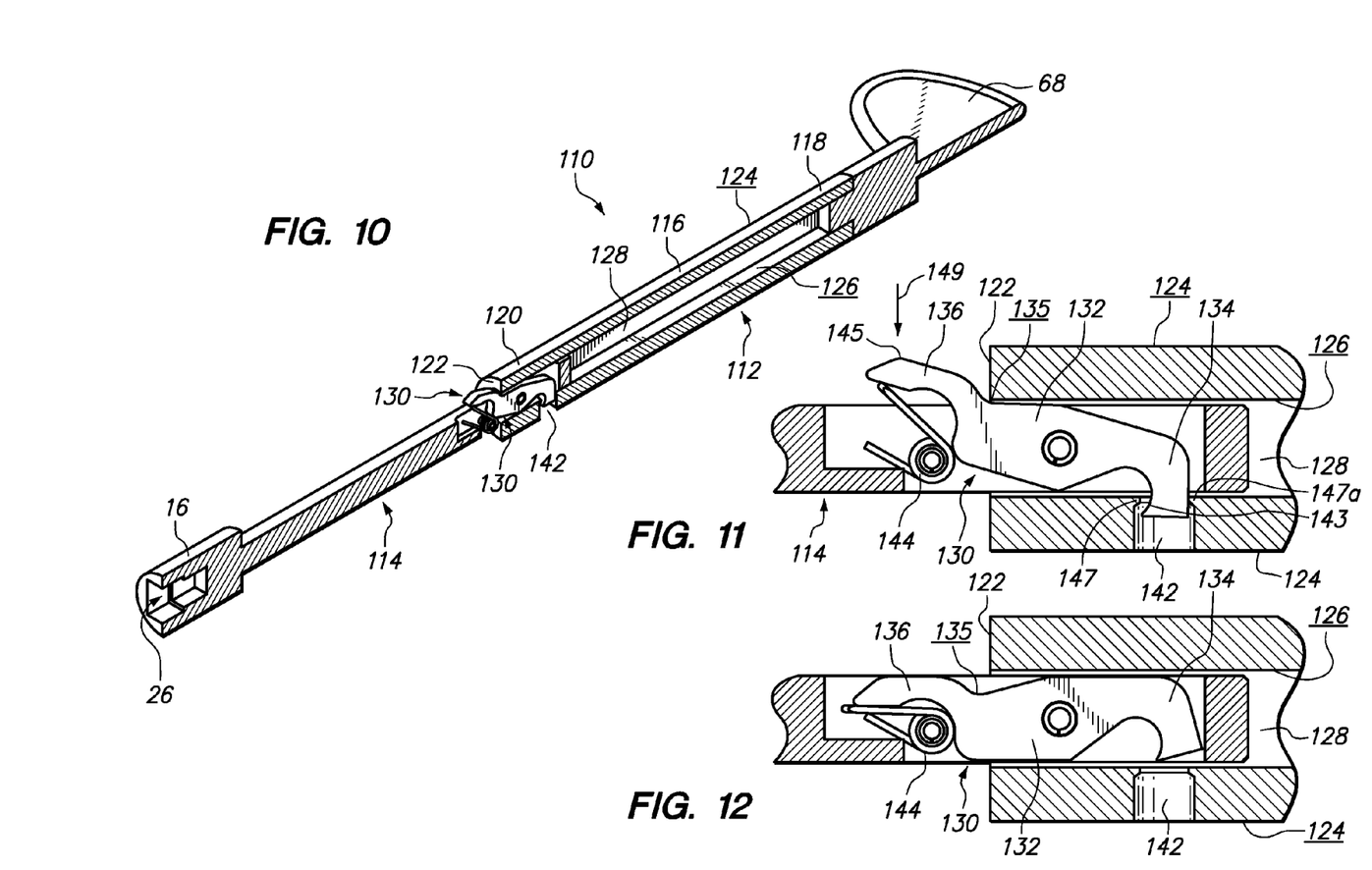
FIG. 10 is a cross sectional view of the gas valve key depicted in FIG. 9.
FIG. 11 is an enlarged cross sectional view of a locking element disposed in a locked configuration.
FIG. 12 is an enlarged cross sectional view of the locking element disposed in the unlocked configuration.

Referring specifically to the embodiment depicted in FIG. 10, the gas valve key 110 includes a first elongate member 112, and a second elongate member 114 slidably connected to the first elongate member 112. The first elongate member 112 is defined by a first body 116 having a first proximal end portion 118 and a first distal end portion 120 defining a first end face 122. The first body 116 includes a first outer surface 124 and a first inner surface 126 extending into the first body 116 from the first end face 122 to define a body cavity 128. The body cavity 128 is sized to receive the second elongate member 114 to enable slidable movement of the second elongate member 114 relative to the first elongate member 112. The cross sectional inner circumference of the body cavity 128, is slightly larger than the cross section outer circumference of the second elongate member 114 to allow the second elongate member 114 to move within the first elongate member 112.

When the second elongate member 114 is extended from the first elongate member 112, it is desirable to lock the second elongate member 114 in place relative to the first elongate member 112. Accordingly, the gas valve key 110 includes a locking element 130 configured to mitigate movement of the second elongate member 114 relative to the first elongate member 112 when the second elongate member 114 is in the extended position.

Referring now specifically to FIGS. 11 and 12, the locking element 130 is rotatably connected to the second elongate member 114, and is rotatable between a locked configuration (shown in FIG. 11) and an unlocked configuration (shown in FIG. 12). The locking element 130 includes a locking body 132 having a locking proximal end portion 134 and a locking distal end portion 136. The locking proximal end portion 134 defines a hook 143, while the locking distal end portion 136 defines an actuator 145. When the locking element 130 is in the locked configuration, the hook 143 is inserted into an aperture 142 which extends from the first inner surface 126 toward the first outer surface 124. In the embodiment depicted in FIGS. 11 and 12, the diameter of the aperture 142 is smaller adjacent the first inner surface 126 than the diameter of the aperture adjacent the first outer surface 124 and forms a lip 147. This promotes contact between the hook and the first body 116 when the locking element 130 is in a locked configuration. When the user pulls the handle 68, the hook 143 locks onto the lip 147 to prevent pullout of the second elongate member 114 from the first elongate member 112. Therefore, as the user pulls the gas valve key 110 out of the gas valve stem (not shown) and if the valve engagement body 16 is stuck on the gas valve stem, the user may continue to pull on the handle 68 until the valve engagement body 16 is dislodged from the gas valve stem.

Push in of the second elongate member 114 relative to the first elongate member 112 is mitigated when the locking element 130 is in the locked configuration. The locking body 132 defines an abutment surface 135 which contacts the first body 116 when the locking element 130 is in the locked configuration (see FIG. 11). The locking proximal end portion 134 also contacts the lip 147a (see FIG. 11) when one attempts to push the second elongate member 114 back into the first elongate member 112 when the locking element 130 is in the locked configuration. Therefore, as a user presses the gas valve key 110 against a gas valve stem (not shown), and the gas valve key 110 is in the extended position, the second elongate member 114 may remain fixed relative to the first elongate member 112 to allow a user to apply a force to the valve stem.

A spring 144 may be connected to the second elongate member 114 and be engaged with the locking element 132 bias the locking element 130 toward the locked configuration. Therefore, in order to rotate the locking element 130 from the locked configuration toward the unlocked configuration, the biasing force created by the spring 144 must be overcome.

When a user desires to move the gas valve key 110 from the extended position toward the retracted position, the user rotates the locking element 130 from the locked configuration toward the unlocked configuration by overcoming the bias force. The actuator 145 is specifically configured to be accessible to the user when the locking element 130 is in the locked configuration. As shown in FIG. 11, the actuator 145 extends out of the body cavity 128 in front of the first end face 122. The user may press down on the actuator 145 in direction of arrow 149 to rotate the locking element 130 toward the unlocked configuration (see FIG. 12), which overcomes the spring 144 bias force and removes the hook 143 from the aperture 142. The locking element 130 is sized to fit inside of the body cavity 128 when the locking element 130 is in the unlocked configuration to allow the second elongate member 114 to slide into the body cavity 128.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. An extendable gas valve key for use with a gas valve stem, the extendable gas valve key comprising:
    a first elongate member defined by a first body having a first proximal end portion, a first distal end portion defining a first end face, a first outer surface, and a first inner surface extending into the first body from the first end face to define a body cavity, a first body aperture extending from the first inner surface toward the first outer surface;
    a second elongate member defined by a second body having a second proximal end portion and a second distal end, the second elongate member being slidably connected to the first elongate member, the second elongate member being slidable between an extended position and a retracted position, an extended portion of the second elongate member extending between the first end face and the second distal end, the extended portion being extendable upon movement of the second elongate member from the retracted position towards the extended position;
    a locking element having a hook portion and a locking distal end portion, the locking element being rotatable relative to the second body between a locked configuration and an unlocked configuration, the hook portion being disposed within the first body aperture when the locking element is in the locked configuration to mitigate movement of the second elongate member relative to the first elongate member when the second elongate member is in the extended position, the hook portion being removed from the first body aperture when the locking element is in the unlocked configuration, the locking distal end portion defining an actuator, the actuator being configured to be accessible when the second elongate member is in the extended position and the locking element is in the locked configuration, the actuator being configured to be inaccessible when the second elongated member is in the retracted position; and
    a valve engagement body connected to one of the first elongate member and the second elongate member, the valve engagement body being sized and configured to be engageable with the gas valve stem.

2. The extendable gas valve key of claim 1, wherein the second body is slidable within the body cavity.

3. The extendable gas valve key of claim 1, wherein the valve engagement body includes an engagement proximal end portion and an engagement distal end portion defining an engagement end face, the valve engagement body including a stem receiving cavity extending inwardly along a valve engagement axis from the engagement end face and defining a substantially quadrangular cross section in a plane substantially perpendicular to the valve engagement axis.

4. The extendable gas valve key of claim 1, wherein the valve engagement body includes an engagement proximal end portion and an engagement distal end portion defining an engagement end face, the valve engagement body including a pair of cascaded stem receiving cavities extending inwardly from the engagement end face, each of the plurality of cascaded stem receiving cavities adapted to receive a valve stem of differing dimensions.

5. The extendable gas valve key of claim 4, wherein one of the pair of cascaded stem receiving cavities is adapted to receive an approximately ⁵⁄₁₆ inch wide valve stem and the other of the pair of cascaded stem receiving cavities is adapted to receive an approximately ¼ inch wide valve stem.

6. The extendable gas valve key of claim 1, further including a spring connected to the second elongate member and engageable with the locking element to bias the locking element toward the locked configuration.

7. The extendable gas valve key of claim 1, further comprising a handle connected to the other of the first elongate member and the second elongate member.

8. An extendable gas valve key for use with a gas valve stem, the extendable gas valve key comprising:
  a first elongate member defined by a first body having a first proximal end portion, a first distal end portion defining a first end face, a first outer surface, and a first inner surface extending into the first body from the first end face to define a body cavity, a first body aperture extending from the first inner surface toward the first outer surface;
  a second elongate member defined by a second body having a second proximal end portion and a second distal end, the second elongate member being slidably connected to the first elongate member, the second elongate member being slidable between an extended position and a retracted position, an extended portion of the second elongate member extending between the first end face and the second distal end, the extended portion being extendable upon movement of the second elongate member from the retracted position towards the extended position;
  a locking element having includes a locking body having a locking proximal end portion and a locking distal end portion, the locking proximal end portion defining a hook portion, and the locking distal end portion defining an actuator, the locking element being rotatable relative to the second body between a locked configuration and an unlocked configuration, the hook portion being disposed within the first body aperture when the locking element is in the locked configuration to mitigate movement of the second elongate member relative to the first elongate member when the second elongate member is in the extended position, the hook portion being removed from the first body aperture when the locking element is in the unlocked configuration, the actuator being configured such that when the second elongate member is in the extended position and the locking element is in the locked configuration, the actuator extends out of the body cavity and in front of the first end face; and
  a valve engagement body connected to one of the first elongate member and the second elongate member, the valve engagement body being sized and configured to be engageable with the gas valve stem.

9. The extendable gas valve key of claim 8, wherein the second body is slidable within the body cavity.

10. The extendable gas valve key of claim 8, wherein the valve engagement body includes an engagement proximal end portion and an engagement distal end portion defining an engagement end face, the valve engagement body including a stem receiving cavity extending inwardly along a valve engagement axis from the engagement end face and defining a substantially quadrangular cross section in a plane substantially perpendicular to the valve engagement axis.

11. The extendable gas valve key of claim 8, wherein the valve engagement body includes an engagement proximal end portion and an engagement distal end portion defining an engagement end face, the valve engagement body including a pair of cascaded stem receiving cavities extending inwardly from the engagement end face, each of the plurality of cascaded stem receiving cavities adapted to receive a valve stem of differing dimensions.

12. The extendable gas valve key of claim 11, wherein one of the pair of cascaded stem receiving cavities is adapted to receive an approximately ⁵⁄₁₆ inch wide valve stem and the other of the pair of cascaded stem receiving cavities is adapted to receive an approximately ¼ inch wide valve stem.

13. The extendable gas valve key of claim 8, further including a spring connected to the second elongate member and engageable with the locking element to bias the locking element toward the locked configuration.

14. The extendable gas valve key of claim 8, further comprising a handle connected to the other of the first elongate member and the second elongate member.

15. An extendable gas valve key for use with a gas valve stem, the extendable gas valve key comprising:
  a first elongate member defined by a first body having a first proximal end portion, a first distal end portion defining a first end face, a first outer surface, and a first inner surface extending into the first body from the first end face to define a body cavity, a first body aperture extending from the first inner surface toward the first outer surface;
  a second elongate member defined by a second body having a second proximal end portion and a second distal end, the second elongate member being slidably connected to the first elongate member, the second elongate member being slidable between an extended position and a retracted position, an extended portion of the second elongate member extending between the first end face and the second distal end, the extended portion being extendable upon movement of the second elongate member from the retracted position towards the extended position; and
  a locking element having a hook portion and a locking distal end portion, the distal end portion defining an actuator, the locking element being rotatable relative to the second body between a locked configuration and an unlocked configuration, the hook portion being disposed within the first body aperture when the locking element is in the locked configuration to mitigate movement of the second elongate member relative to the first elongate member when the second elongate member is in the extended position, the hook portion being removed from the first body aperture when the locking element is in the unlocked configuration, the actuator being configured to extend out of the body cavity and in front of the first end face in a direction opposed to the first body aperture so as to be accessible when the second elongate member is in the extended position and the locking element is in the locked configuration;

a valve engagement body connected to one of the first elongate member and the second elongate member, the valve engagement body being sized and configured to be engageable with the gas valve stein.

16. The extendable gas valve key of claim 15, wherein the second body is slidable within the body cavity.

17. The extendable gas valve key of claim 15, further including a spring connected to the second elongate member and engageable with the locking element to bias the locking element toward the locked configuration.

18. The extendable gas valve key of claim 15, further comprising a handle connected to the other of the first elongate member and the second elongate member.

* * * * *